United States Patent [19]

Aoki

[11] Patent Number: 4,741,688
[45] Date of Patent: May 3, 1988

[54] INJECTION STRETCHING AND BLOW MOLDING MACHINE

[76] Inventor: Katashi Aoki, 6037 Ohazaminamijo, Sakaki-machi, Hanishina-gun, Nagano-ken, Japan

[21] Appl. No.: 932,561

[22] Filed: Jan. 5, 1987

Related U.S. Application Data

[60] Continuation of Ser. No. 638,949, Aug. 8, 1984, abandoned, which is a division of Ser. No. 491,030, May 3, 1983, abandoned.

[30] Foreign Application Priority Data

May 1, 1982 [JP] Japan ................................ 57-78752
May 10, 1982 [JP] Japan ................................ 57-77988

[51] Int. Cl.⁴ ...................... B29C 49/06; B29C 49/64
[52] U.S. Cl. .................................. 425/526; 264/515; 264/538; 425/529; 425/533; 425/540
[58] Field of Search ............... 425/112, 525, 526, 533, 425/130, 532, 533, 540, 574, 576, 588, 528, 529, 534, 535; 264/512, 513, 515, 516, 537, 538; 220/69

[56] References Cited

U.S. PATENT DOCUMENTS

| | | | |
|---|---|---|---|
| 4,105,391 | 8/1978 | Aoki ..................................... | 425/526 |
| 4,233,022 | 11/1980 | Brady et al. ......................... | 425/526 |
| 4,264,558 | 4/1981 | Jacobsen ............................. | 425/526 |
| 4,303,381 | 12/1981 | Aoki ..................................... | 425/525 |

FOREIGN PATENT DOCUMENTS

| | | | |
|---|---|---|---|
| 57-13417 | 3/1982 | Japan ................................... | 264/512 |
| 1122516 | 8/1968 | United Kingdom ................ | 264/513 |
| 1558409 | 1/1980 | United Kingdom ................ | 220/69 |

*Primary Examiner*—Jay H. Woo
*Assistant Examiner*—Timothy W. Heitbrink
*Attorney, Agent, or Firm*—Louis Weinstein

[57] ABSTRACT

The present invention provides an injection and blow molding machine which comprises a machine bed having five operating sections, i.e., an injection molding section, a temperature control section, a stretching and blow section, a secondary working and releasing section and a releasing section, a base plate mounted in a peripheral portion above and parallel to said machine bed, a rotary disk rotatably mounted on the under-surface of said base plate and having neck molds of the same number as that of the operating sections, and a drive means fixedly mounted on the central portion of the base plate to intermittently turn the rotary disk with respect to the respective operating sections. It is of course that between the rotary disk and the machine bed, there are provided an injection mold disposed movably up and down, a temperature control member, a blow mold and a mechanism for opening and closing the blow mold, which are disclosed in U.S. Pat. No. 4,105,391, and operating mechanisms similar to an injection mold opening and closing mechanism, a temperature control mechanism, a stretching and blow mechanism and a molded product releasing mechanism on the base plate.

4 Claims, 4 Drawing Sheets

4,741,688

INJECTION STRETCHING AND BLOW MOLDING MACHINE

This is a continuation of application Ser. No. 638,949, filed Aug. 8, 1984 now abandoned which is a division of application Ser. No. 491,030 filed May 3, 1983, now abandoned.

BACKGROUND OF THE INVENTION

Hollow molded products such as plastic bottles formed by stretching and blow molding are excellent in transparency and strength as compared with hollow molded products formed by blow molding and are being extensively used as bottles for beverages and as containers for various contents.

With extension of uses, it has been desired to increase the strength of hollow molded products and provide products which have their external shape suited for the contents. In the case of bottles for carbonated beverages, a separately molded base cup is fitted on a bottom of the hollow molded product in an attempt to increase the strength of the bottom thereof.

In fitting the base cup, a device is required in which the base cup coated with an adhesive is fitted and pressed on the bottom of the hollow molded product, and after the hollow molded product is removed from the molding machine, it must be fed into the device. This procedure involves disadvantages in that much trouble is required and product loss tends to occur.

To cope with these problems, the present inventor has developed a setting device, which was described in a previously filed application now U.S. Pat. No. 4,303,381), in which a base cup is inserted into a stretching and blow mold assembly and the base cup is fitted simultaneously with stretching and blow molding of a hollow molded product. However, in the presently existing distributor, it is difficult to positively supply the required number of base cups to the setting device at all times. The distributor needs to be improved in order to meet the practical requirements, and the disadvantages noted above are not yet eliminated. At present, for large bottles for carbonated beverages, a separate device is used to fit the base cups.

Where plastic bottles or the like formed by stretching and blow molding are used as containers for fruit juice, honey, Japanese sake, etc. which require the step of heating and filling, the thermal stability needs to be improved to prevent containers from being deformed due to the thermal shrinkage when filled with heated fluid.

Even in case of polyethylene telephatalate bottles which are used as containers for carbonated beverages which particularly involve a problem in their heat resisting property but which are excellent with regard to their gas barrier property, it is partly embodied that the bottles are subjected to heat treatment to impart the heat resisting property thereto for the reason that if the heat resisting property thereof is enhanced, they can be used also as bottles for fruit juice which has a high filling temperature.

This heat treatment is accomplished by using a separate special device after a molded bottle has been removed. Therefore, the production efficiency is poor and additional labors are required, thus tending to increase the cost. In view of these circumstances, it has been desired to develop a molding machine which will not particularly increase the cost of products.

The stretching and blow molding of hollow molded products is roughly divided into two means or categories. One means is a cold parison system in which a pre-injection molded parison is heated to a molding temperature, after which it is stretched and blow molded into a hollow molded product. The other means is a hot parison system in which an injection molded parison is immediately stretched and blow molded while the parison is in a heated condition.

As one of the machines of the aforesaid hot parison system, the machine invented by the present inventor is disclosed in U.S. Pat. No. 4,105,391. The injection stretching and blow molding machine described in said patent has a rotary disk which is disposed above a machine bed leaving a work space, and about the rotary disk, there are four operating sections which respectively perform injection molding, temperature controlling, stretching and blow molding, and releasing of parisons. The machine is provided with a construction in which the aforesaid four operations are simultaneously carried out every stop of said rotary disk provided on the lower surface thereof with a plurality of neck molds for holding the injection molded parisons in a vertical direction.

The present inventor has achieved a new invention of an injection stretching and and blow molding machine, which has been developed by the person himself and is actually used as the ASB machine, in order to meet a demand as containers for carbonated beverages and a demand as containers filled with fruit juice or the like by heating.

SUMMARY OF THE INVENTION

It is therefore a first object of the present invention to provide, in the molding machine previously invented by the present inventor, a novel and improved injection stretching and blow molding machine which enables to apply the secondary working to stretched and blow molded hollow molded products, by which secondary working, various problems encountered in containers may be solved.

It is a second object of the present invention to provide, in the aforesaid molding machine, an injection stretching and blow molding machine which is provided with operating sections which can apply the secondary working to hollow molded products during the movement of the hollow molded products from a stretching and blow operating section to a releasing operating section.

It is a third object of the present invention to provide an injection stretching and blow molding machine in which operations including an operation of the secondary working operating section may be carried out within the time at which said rotary disk is stopped, and the operation from the injection molding of a parison to the releasing of a hollow molded product subjected to the secondary working may be carried out by movement of the intermittently rotating rotary disk.

It is another object of the present invention to provide an extremely economical injection stretching and blow molding machine in which various secondary processes applied to hollow molded products, for example, such as injection molding, heat treatment, gas barrier or the like for base cups may be carried out in a secondary working operating section disposed between a stretching and blow operating section and a releasing operating section, and which requires no preparation of a special device for the secondary working.

All of the above-described objects may be achieved by the provision of the secondary working operating section between the stretching and blow operating section and the releasing operating section. All the operating sections disposed on the machine bed including the secondary working operating section are arranged in an equally spaced relation, said operating sections normally comprising five operating sections but in the case where temperature control of parisons need not be required, four operating sections will suffice.

According to an aspect of the present invention, an injection and blow molding machine comprises a machine bed having five operating sections, i.e., an injection molding section, a temperature control section, a stretching and blow section, a secondary working and releasing section, and a releasing section, a base plate mounted in a peripheral portion above and parallel to said machine bed, a rotary disk rotatably mounted on the under-surface of said base plate and having neck molds of the same number as that of the operating sections, and a drive means fixedly mounted on the central portion of the base plate to intermittently turn the rotary disk with respect to the respective operating sections. It is of course understood that between the rotary disk and the machine bed, there are provided an injection mold disposed movably up and down, a temperature control member, a blow mold and a mechanism for opening and closing the blow mold, which are disclosed in U.S. Pat. No. 4,105,391, and operating mechanisms similar to an injection mold opening and closing mechanism, a temperature control mechanism, a stretching and blow mechanism and a molded product releasing mechanism on the base plate.

In the event that the aforesaid secondary working operating section is provided for the purpose of injection molding a base cup, an externally fitting part or the like on a stretched and blow molded hollow molded product, a secondary working mold for closing the hollow molded product as an injection core and a secondary injection device are provided in the secondary working operating section.

Further, in the event that the secondary working operating section is provided for the purpose of heat treating the stretched and blow molded hollow molded product, a heat treating mold having a similar construction to that of a blow mold in the stretching and blow operating section and a blow core are provided in the secondary working operating section.

In the apparatus which is disposed in the secondary working operating section as described above, all the other operating sections always have the same structure irrespective of the purpose of the secondary working though being different depending on the purpose of the secondary working with respect to hollow molded products. A power source for the operating mechanisms in the operating sections comprises a power source such as air, oil pressure, electricity, etc. which are used in molding synthetic resins.

BRIEF DESCRIPTION OF THE DRAWINGS

The drawings show essential portions of an injection stretching and blow molding machine in accordance with the present invention.

DETAILED DESCRIPTION OF THE INVENTION

Figure 1:
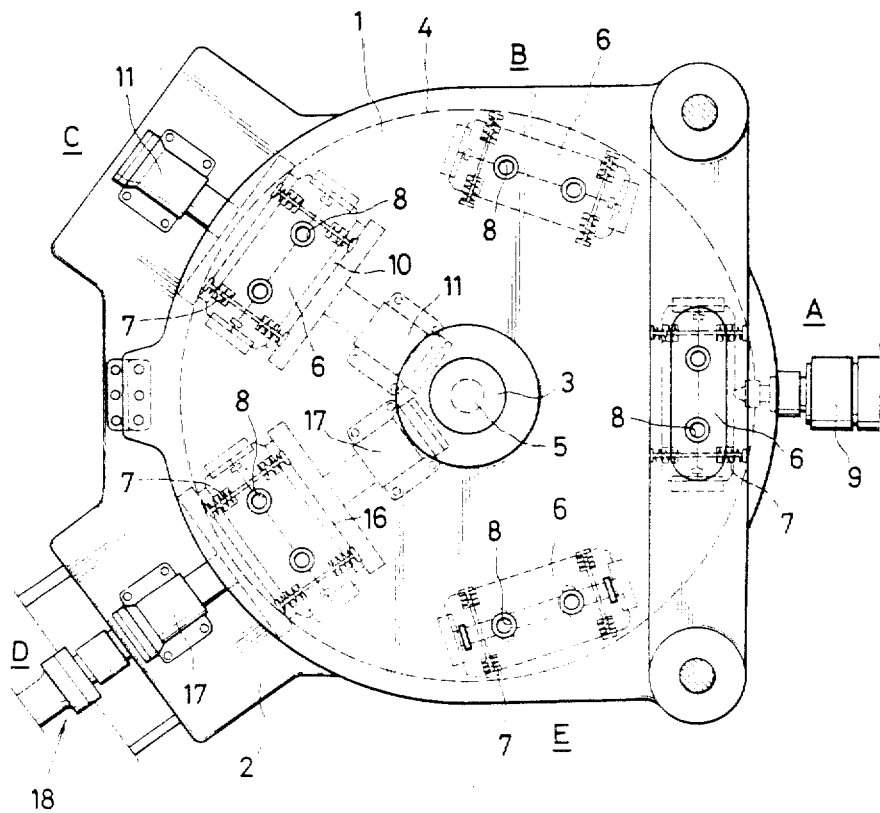
FIG. 1 is a plan view of a molding machine with operating mechanisms provided on the base plate omitted.

Referring now to the accompanying drawings, the details of the embodiment of the present invention will be described in the following.

In the drawings, a reference numeral 1 designates a base plate which is fixed in parallel above a machine bed 2 leaving a predetermined space, and a drive device 3 is fixed in a central portion of an upper surface thereof. This drive device 3 is provided to intermittently turn a horizontally aligned rotary disk 4 provided in the proximity of the underside of the base plate 1, which drive device is one commercially available which is motor-driven or hydraulically driven. A drive shaft 5 is in communication with the rotary disk 4 through transmission means.

Five neck molds each comprised of mold halves 6, 6 are attached to the peripheral under-surface of the rotary disk 4 in a given spaced relation and in such a manner that they may be opened and closed in a radial direction with springs 7, 7 acted thereon. Five operating sections, i.e., an injection molding operating section A, a temperature control operating section B, a stretching and blow molding operating section C, a secondary working operating section D and a releasing operating section E are formed on the machine bed, which correspond to the neck molds 6, 6, respectively. In the base plate 1 and the rotary disk 4 in portions corresponding to the operating sections, respectively, are bored a required number of holes 8, 8a which downwardly guide various cores and mold opening members operated by the operating mechanisms provided on the base plate of said corresponding portions though not shown.

The above-described injection molding operating section A further has an injection device 9, an injection molding mold and a mold clamping device provided thereon, and the temperature control operating section B has a temperature control pot provided thereon, said pot being moved up and down. The details of these are already disclosed in U.S. Pat. No. 4,105,391 and comprise no part of the novel subject matter of the present invention, which therefore will not be further described. The stretching and blow molding operating section C has a blow molding mold 10 and hydraulically operated opening and closing devices 11, 11 provided for movement in a radial direction of the product being blow molded.

Figure 2:
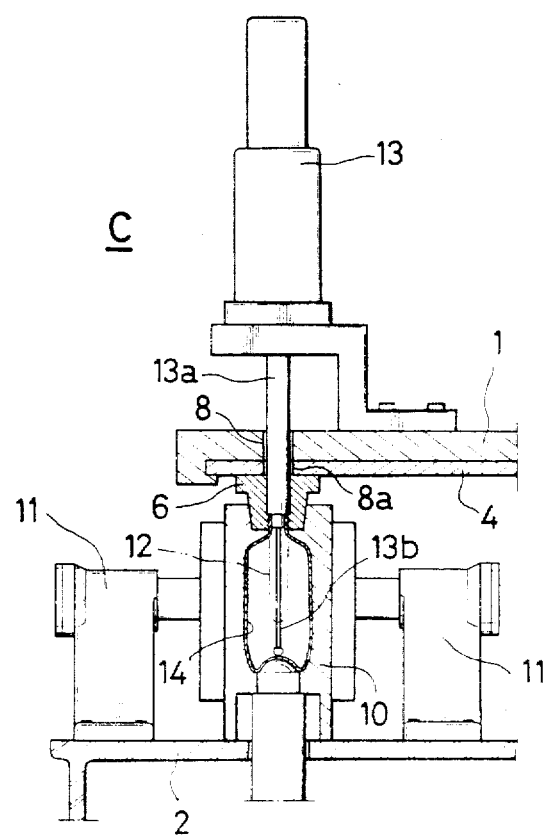
FIG. 2 is a longitudinal sectional view of a stretching and blow operating section.

The above-described blow mold 10 comprises a pair of split molds closed with the neck mold 6 placed therebetween, as shown in FIG. 2. Into the neck mold 6 holding a parison with a bottom 12 in a central portion of the mold is inserted a blow core 13a which has moved down from the base plate 1 respectively passing through the holes 8, 8a of the base plate 1 and the rotary disk 4 by an elevating device 13 provided on the upper surface of the base plate 1, and the parison with a bottom 12 is axially stretched by means of a stretching rod 13b placed in the blow core 13a and is expanded by compressed air from the blow core 13a to form a hollow molded product 14.

Figure 3:
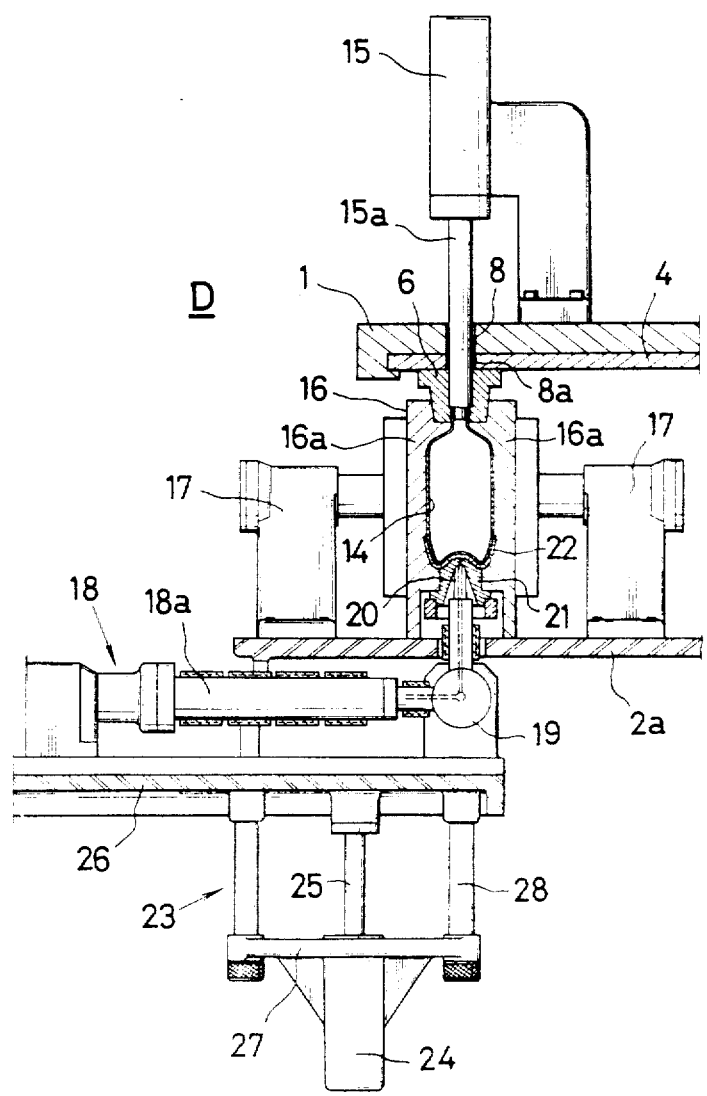
FIG. 3 is a longitudinal sectional view of a secondary working operating section having a function in which a base cup is molded on a hollow molded product.

Next, in the secondary working operating section D, there are radially provided a secondary working mold 16, hydraulic opening and closing devices 17, 17 and a secondary injection device 18, as shown in FIG. 3. A cavity of the secondary working mold 16 comprises a pair of split molds 16a, 16a in the same form as that of the cavity of the blow mold 10 except for a lower portion of the cavity, and the cavity of the secondary working mold 16 embraces a hollow molded product 14 being transferred while being held by the neck mold 6 together with the neck mold 6. Into the neck mold 6 is inserted a secondary blow core 15a while extending through the base plate 1 and holes 8, 8a of the rotary disk 4 by the elevating device 15 provided on the upper surface of the base plate 1, and compressed air which is higher than injection pressure is blown into the hollow molded product 14 from the secondary blow core 15a to maintain the hollow molded product 14 as an injection core.

The secondary injection device 18 is disposed with an injection cylinder 18a inserted into the interior thereof from the side of the machine bed 2, a nozzle 20 projected from a hot runner block 19 is brought into nozzle touch with a central portion of a bottom mold 21 of the secondary molding mold 16 through a floor plate 2a of the machine bed, and a secondary molding cavity of a base cup 22 for covering a seat portion of a hollow holding product is formed between the bottom mold 21, the lower portion of the cavity and the bottom of the hollow molded product 14.

A reference numeral 23 designates an elevating device for the secondary injection device 18 and comprises a seat plate 26 connected to a piston rod 25 of a cylinder 24 hydraulically or pheumatically operated, and a seat plate guide rod 28 supported on a fixed plate 27 integral with the cylinder 24 so as to elevate the secondary injection device 18 placed on and secured to the seat plate 26 together with the latter in response to opening and closing of the secondary working mold 16. At this time, the bottom mold 21 also elevates together with the nozzle 20 between the floor plates.

In the aforementioned molding machine, the rotary disk 4 is turned counterclockwise for every 72 degrees. This intermittent rotation can be achieved by using various devices generally employed and therefore will not be further described.

With the above-described construction, the parison with a bottom 12 is first molded in the injection molding operating section A, the parison with a bottom 12 is transferred to the temperature control operating section B while being held by the neck mold 6, the parison after temperature controlled is transferred to the stretching and blow molding operating section C, and after the mold is closed as described above, the parison is stretched and blow molded into the hollow molded product 14. The steps as just mentioned are the same as those described in U.S. Pat. No. 4,105,391.

Subsequently, the hollow molded pruduct 14 is held by the neck mold 6 and transferred to the center of the secondary working mold 16 which is in an open state in the secondary working operation section D, and the mold is closed whereby the product is embraced by the secondary working mold 16. At this time, the injection device 18 moves up, and the bottom mold 21 moves up together with the nozzle 20 to form a cavity in the periphery of the bottom of the hollow molded product 14.

A secondary blow core 15a is inserted into the neck mold 6, and compressed air is further blown into the hollow molded product 14 to maintain internal pressure therein at a higher level than injection pressure to form the hollow molded product 14 into an injection core. Thereafter, a resin is injected in the periphery of the bottom of the hollow molded product 14 to secondarily mold the base cup 22.

The hollow molded product 14 already subjected to the secondary working in a manner as described above is transferred, after the mold is opened, to the releasing operating section E, and the product is removed outside the machine by opening the neck mold 6.

While in the foregoing, the injection molding of the base cup has been described as an example of the secondary working, it should be understood that the injection molding is not limited only to the base cup 22, but secondary worked products of suitable shape can be molded depending on the use of shape of the hollow molded product 14.

In the above-described embodiment, the secondary working operating section D is provided between the stretching and blow molding operating section C and the releasing operating section E, and the secondary working mold 16 which closes the hollow molded product 14 as well as the injection core and the secondary injection device 18 are provided in said operating section whereby the injection molding of the parison with a bottom, the stretching and blow molding of the hollow molded product and the secondary injection molding of the base cup or the like may be consecutively carried out. With this arrangement, loss of products can be reduced as compared with the case where the secondary working of the product is applied after the hollow molded article is removed, and the secondary working device need not be provided to provide labor-saving, thus reducing the product cost.

Moreover, also in connection with the molding machine, a further operating section can be merely added by one and other operating sections can be advantageously utilized without modification and the construction itself is not particularly complicated.

Figure 4:
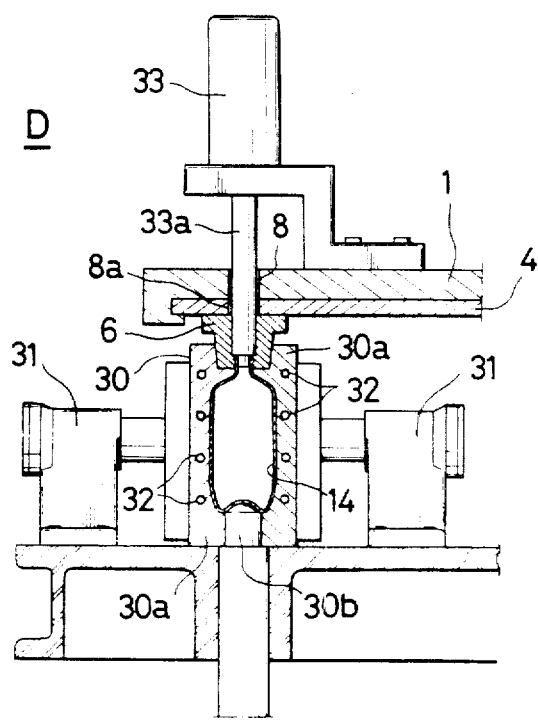
FIG. 4 is a longitudinal sectional view of the secondary working operating section having a function for the heat treatment of the hollow molded products.

FIG. 4 shows the case where heat treatment of the hollow molded product 14 is carrier out in the secondary working operating section D. In the secondary working operating section D, there are radially provided a heat treating mold 30 and hydraulic opening and closing devices 31, 31 on the machine bed 2. A cavity of the heat treating mold 3 comprises a pair of split molds 30a, 30a which have the same cavity as that of the blow molding mold 10 and are provided with the heat medium passages 32, 32 and a bottom mold 30b as shown, and the cavity is constructed to embrace the hollow molded product 14 transferred while being held by the neck mold 6 together with the latter. Into the neck mold 6 is inserted a heated air blow core 33a extending through the base plate 1 and the holes 8, 8a of the rotary disk 4 by the elevating device 33 on the base plate 1, and high temperature air is blown into the hollow molded product 14 from the blow core 33a to apply heat treatment to the hollow molded article 14 together with the heat treating mold 30.

Accordingly, the hollow molded product 14 is held by the neck mold 6, transferred to the center of the heat treating mold 30 which is in an open state in the secondary working operating section D, and embraced by the heat treating mold 16 closed and heated to a predetermined temperature. The heating air blow core 33a is inserted into the neck mold 6, and high temperature air is blown into the hollow molded product 14, which is then subjected heat treatment while maintaining the intimate contact thereof with the cavity for a predetermined period of time.

The hollow molded product 14 already subjected to heat treatment in a manner as described above is transferred, after the mold is opened, to the releasing operating section E, and said product is removed outside the machine as a hollow molded product having a heat resisting property by opening the neck mold 6 for use as a container for fruit juice.

In the above-described embodiment, the secondary working operating section D is provided between the stretching and blow molded station C and the releasing operating section E, and the hollow molded product 14 subjected to the stretching and blow molding in said operating section can be immediately heat treated in the subsequent operating section. With this arrangement, the hollow molded product need not be subjected to heat treatment by other devices as in prior arts. In addition, since the hollow molded product can be accommodated in the same cavity as that of the mold used at the time of molding and subjected to heat treatment in the condition wherein internal pressure is applied thereto, deformation can be minimized and loss resulting from the heat treatment can be minimized.

What is claimed is:

1. An injection stretching and blow molding machine comprising:
   a base plate secured parallel to and spaced from a machine bed;
   a rotary disk supported under the base plate and provided with neck molds in a predetermined spaced relationship;
   a plurality of operating stations including an injection molding operation station, a temperature control operating station, and a stretching and blow molding operation station arranged in that order on said machine bed;
   drive means for intermittently turning said rotary disk for predetermined intervals to move said neck molds relative to said plurality of stations;
   a secondary working operating station disposed on said machine bed between said stretching and blow molding operating station and a releasing operating station;
   said secondary working operating station including a split mold for receiving the hollow molded product and said neck mold, a mechanism for opening and closing said split mold, passageways in said mold for conducting a heat medium to heat the hollow molded product to a predetermined temperature, and a secondary blow core for insertion in to the hollow molded product for blowing high temperature air into the hollow molded product to urge the hollow blow molded product against the engaging surface of the split mold.

2. An injection stretching and blow molding machine comprising:
   a base plate secured parallel to and spaced from a machine bed;
   a rotary disk supported under the base plate and provided with neck molds in a predetermined spaced relationship;
   a plurality of operating stations including an injection molding operating station, a temperature control operating station, and a stretching and blow molding operating station arranged in that order on said machine bed;
   drive means for intermittently turning said rotary disk for predetermined intervals to move said neck molds relative to said plurality of stations;
   a secondary working operating station disposed on said machine bed between said stretching and blow molding operating station and a releasing operating station; and
   said secondary working operating station including a split mold for receiving the hollow molded product and said neck mold and forming a secondary partial molding cavity relative to the hollow molded product, a mechanism for opening and closing said split mold, a secondary blow core for insertion into the hollow molded product and introducing air under pressure for urging the hollow molded product against the cavity in the split mold, and a secondary injection device having a nozzle in contact with said secondary partial molding cavity.

3. An injection stretching and blow molding machine according to claim 2, wherein the secondary molding cavity includes a cavity for molding a base cup for covering a bottom of the hollow molded product.

4. An injection stretching and blow molding machine according to claim 2, wherein the secondary molding cavity includes a cavity for molding an addition to the hollow molded product.

* * * * *

UNITED STATES PATENT AND TRADEMARK OFFICE
CERTIFICATE OF CORRECTION

PATENT NO. :    4,741,688

DATED      :    May 3, 1988

INVENTOR(S) :   Katashi Aoki

It is certified that error appears in the above-identified patent and that said Letters Patent is hereby corrected as shown below:

Column 1, line 33, before "now U.S." insert -- ( --.

Column 5, line 34, "pheumatically" should be --pneumatically--.

Column 5, line 59, "pruduct" should be --product--.

Column 6, line 44, "carrier" should be --carried--.

Column 6, line 49, "3" should be --30--.

Signed and Sealed this

Sixth Day of November, 1990

Attest:

HARRY F. MANBECK, JR.

Attesting Officer

Commissioner of Patents and Trademarks